United States Patent
Baron et al.

(10) Patent No.: US 11,943,283 B2
(45) Date of Patent: *Mar. 26, 2024

(54) DYNAMICALLY ASSIGNING STORAGE LOCATIONS FOR MESSAGING SYSTEM DATA

(71) Applicant: Snap Inc., Santa Monica, CA (US)

(72) Inventors: Bradley Baron, Seattle, WA (US); Benjamin Ralph Hollis, Seattle, WA (US); John Krzemien, Seattle, WA (US); Samuel Young, Bend, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,269

(22) Filed: Apr. 3, 2023

(65) Prior Publication Data
US 2023/0239342 A1 Jul. 27, 2023

Related U.S. Application Data

(63) Continuation of application No. 17/336,668, filed on Jun. 2, 2021, now Pat. No. 11,621,997, which is a (Continued)

(51) Int. Cl.
*G06F 15/173* (2006.01)
*H04L 51/04* (2022.01)
(Continued)

(52) U.S. Cl.
CPC .............. *H04L 67/10* (2013.01); *H04L 51/04* (2013.01); *H04L 51/52* (2022.05); *H04W 4/029* (2018.02);
(Continued)

(58) Field of Classification Search
CPC ......... H04L 67/10; H04L 51/52; H04L 51/04; H04W 4/029; H04W 4/12; H04W 8/02; H04W 8/04; H04W 8/20
See application file for complete search history.

(56) References Cited

U.S. PATENT DOCUMENTS 7,184,945 B1    2/2007    Takahashi et al.
9,380,523 B1    6/2016    Mijar et al.
(Continued)

OTHER PUBLICATIONS

"U.S. Appl. No. 16/880,477, Non Final Office Action dated Sep. 2, 2022", 8 pgs.

(Continued)

*Primary Examiner* — Wing F Chan
*Assistant Examiner* — Joseph R Maniwang
(74) *Attorney, Agent, or Firm* — Schwegman Lundberg & Woessner, P.A.

(57) ABSTRACT

Method of dynamically assigning storage locations starts with the processor updating first user's home location data. Processor selects communication session between first user and second user and determines second user's home location data. Processor determines a session location data that indicates current storage location that stores data of communication session received from first and second client devices. Processor identifies available data storage locations based on first user and second user's home location data and determines whether to update the session location data based on an average of a distance over network fiber using the first user and second user's home locations, current storage location, and available storage locations. In response to determining to update the session location data, processor updates session location data to indicate one of the available storage locations, and causes transfer of data of communication session to one of the available storage locations. Other embodiments are described.

21 Claims, 9 Drawing Sheets

Related U.S. Application Data continuation of application No. 16/880,566, filed on May 21, 2020, now Pat. No. 11,038,951.

(60) Provisional application No. 63/003,158, filed on Mar. 31, 2020.

(51) Int. Cl.

| | |
|---|---|
| *H04L 51/52* | (2022.01) |
| *H04L 67/10* | (2022.01) |
| *H04W 4/029* | (2018.01) |
| *H04W 4/12* | (2009.01) |
| *H04W 8/02* | (2009.01) |
| *H04W 8/04* | (2009.01) |
| *H04W 8/20* | (2009.01) |

(52) U.S. Cl.
CPC .............. *H04W 4/12* (2013.01); *H04W 8/02* (2013.01); *H04W 8/04* (2013.01); *H04W 8/20* (2013.01)

(56) References Cited

U.S. PATENT DOCUMENTS

| | | | |
|---|---|---|---|
| 10,292,037 | B1 | 5/2019 | Gailloux et al. |
| 10,498,812 | B1 | 12/2019 | Varda et al. |
| 11,038,951 | B1 | 6/2021 | Baron et al. |
| 2008/0076420 | A1 | 3/2008 | Khetawat et al. |
| 2008/0215681 | A1 | 9/2008 | Darcie et al. |
| 2013/0176985 | A1 | 7/2013 | Onishi et al. |
| 2015/0052205 | A1 | 2/2015 | Svoboda et al. |
| 2018/0124249 | A1 | 5/2018 | Hassan et al. |
| 2021/0306839 | A1 | 9/2021 | Baron et al. |
| 2021/0360056 | A1 | 11/2021 | Baron et al. |

OTHER PUBLICATIONS

"U.S. Appl. No. 16/880,477, Notice of Allowance dated Dec. 21, 2022", 9 pgs.
"U.S. Appl. No. 16/880,477, Response filed Dec. 2, 2022 to Non Final Office Action dated Sep. 2, 2022", 9 pgs.
"U.S. Appl. No. 16/880,566, Non Final Office Action dated Nov. 2, 2020", 16 pgs.
"U.S. Appl. No. 16/880,566, Notice of Allowance dated Feb. 12, 2021", 10 pgs.
"U.S. Appl. No. 16/880,566, Response filed Dec. 8, 2020 to Non Final Office Action dated Nov. 2, 2020", 10 pgs.
"U.S. Appl. No. 17/336,668, Corrected Notice of Allowability dated Mar. 2, 2023", 4 pgs.
"U.S. Appl. No. 17/336,668, Final Office Action dated Jun. 13, 2022", 19 pgs.
"U.S. Appl. No. 17/336,668, Non Final Office Action dated Jan. 28, 2022", 20 pgs.
"U.S. Appl. No. 17/336,668, Notice of Allowance dated Oct. 27, 2022", 9 pgs.
"U.S. Appl. No. 17/336,668, Preliminary Amendment dated Aug. 16, 2021", 8 pgs.
"U.S. Appl. No. 17/336,668, Response filed Apr. 28, 2022 to Non Final Office Action dated Jan. 28, 2022", 11 pgs.
"U.S. Appl. No. 17/336,668, Response filed Sep. 13, 2022 to Final Office Action dated Jun. 13, 2022", 12 pgs.
U.S. Appl. No. 16/880,477, filed May 21, 2020 Dynamically Assigning Storage Locations for Messaging System Data.
U.S. Appl. No. 16/880,566 U.S. Pat. No. 11,038,951, filed May 21, 2020 Dynamically Assigning Storage Locations For Messaging System Data.
U.S. Appl. No. 17/336,668 U.S. Pat. No. 11,621,997, filed Jun. 2, 2021 Dynamically Assigning Storage Locations For Messaging System Data.
"U.S. Appl. No. 18/306,077, 312 Amendment filed Feb. 1, 2024", 7 pgs.

DYNAMICALLY ASSIGNING STORAGE LOCATIONS FOR MESSAGING SYSTEM DATA

CROSS REFERENCE TO RELATED APPLICATIONS

This application is a continuation of U.S. patent application Ser. No. 17/336,668, filed Jun. 2, 2021, which application is a continuation of U.S. patent application Ser. No. 16/880,566, filed May 21, 2020, now issued as U.S. Pat. No. 11,038,951, which claims the benefit of priority to U.S. Provisional Patent Application Ser. No. 63/003,158, filed Mar. 31, 2020, the contents of each of which are incorporated herein by reference in their entireties.

BACKGROUND

Electronic messaging, particularly instant messaging, continues to grow globally in popularity. Users are quickly able to share with one another electronic media content items including text, electronic images, audio, and video instantly. Given the global nature of our communications, users on messaging systems need to communicate as easily with users in the same city as with users in another country halfway across the world.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

To facilitate the sharing of the large amount of media content items being exchanged between a network of individuals on the messaging system, the system is faced with challenges when dealing with highly mutable and largely ephemeral media content items being sent and received. Among other things, embodiments of the present disclosure improve the functionality of the messaging system by identifying and assigning a storage location for data associated with the users in the messaging system as well as a single storage location for data that is shared between multiple users, for example, in a messaging conversation. The data associated with each of the users can include user data such as profile data, preferences, subscriptions, user connections on the messaging system, etc. The shared data between multiple users in a messaging conversation can media content items (e.g., text messages, images, videos, animations, webpage links, etc.) that were shared with each of the users in the messaging conversation via a messaging interface. The single storage to store this shared data is selected to be optimal when taking into account each of the users in the messaging conversation. For example, the single storage location can be selected based on the home location associated with each of the multiple users. The single storage location can also be selected based on the latency that is experienced or perceived by each of the multiple users during the messaging conversation. The cost or the performance of storage locations can also be considered when selecting the single storage location. The selection of the single storage location can also be reevaluated periodically or upon detection of changes including, for example, a change in the home location of any of the users, a change in the number of available storage locations, a change in the cost or performance of the available storage locations, etc.

Figure 1:
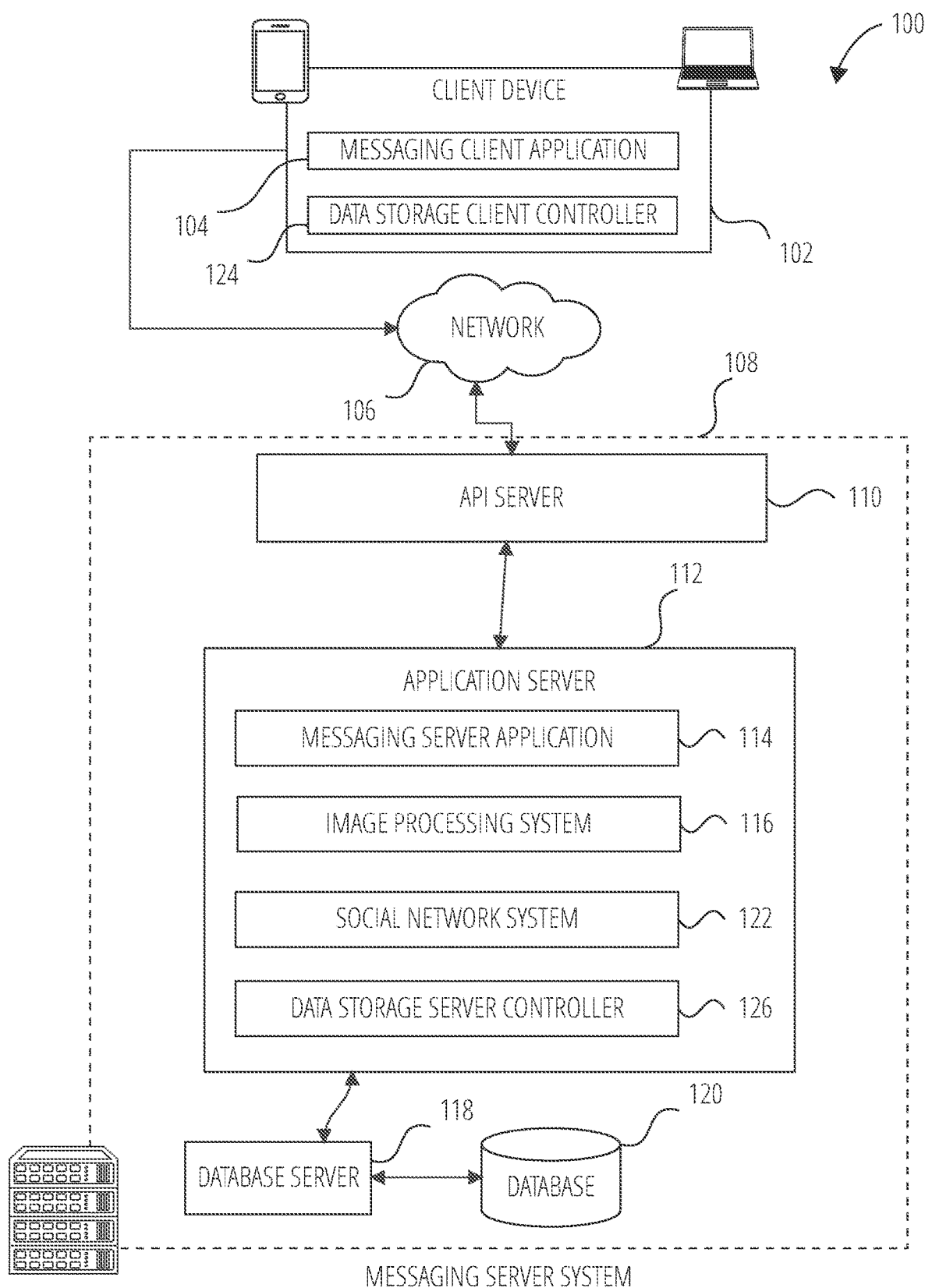
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104 and a data storage client controller 124. Each messaging client application 104 is communicatively coupled to other instances of the messaging client application 104 and a messaging server system 108 via a network 106 (e.g., the Internet). Each data storage client controller 124 can be communicatively coupled to other instances of the data storage client controller 124 and a data storage server controller 126 in the messaging server system 108 via the network 106.

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

The data storage client controller 124 is able to communicate and exchange data with another data storage client controller 124 and with the data storage server controller 126 via the network 106. The data exchanged between the plurality of data storage client controller 124, and between the data storage client controller 124 and the data storage server controller 126 can include the home data location associated with the user of the client device 102, the current location of the client device 102, a history of the previously recorded current locations of the client device 102, functions (e.g., commands to invoke functions) as well as other payload data (e.g., text, audio, video or other multimedia data).

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other Processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
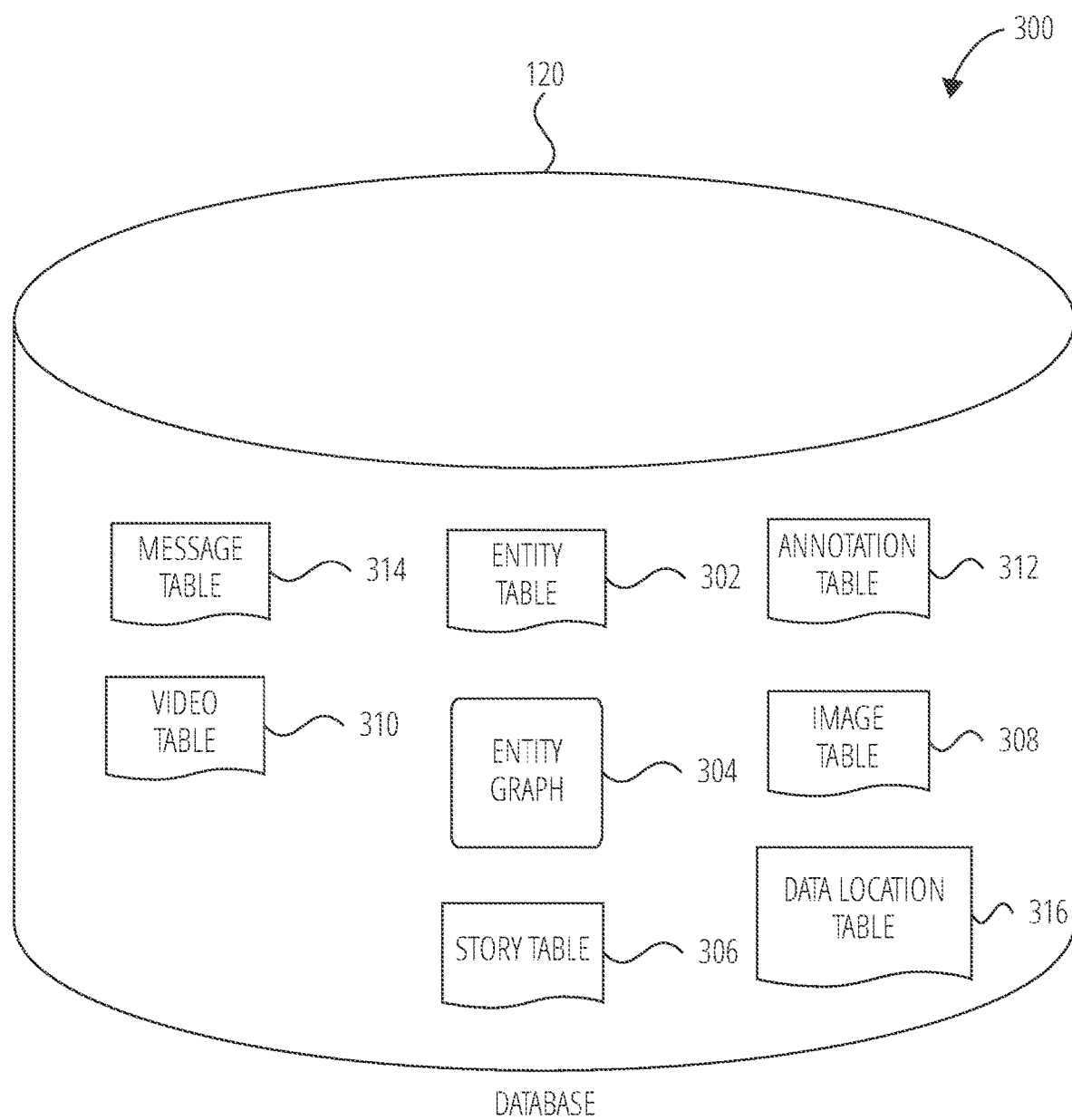
FIG. 3 is a diagrammatic representation of a data structure as maintained in a database, in accordance with some example embodiments.

The social network system 122 supports various social networking functions services and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The application server 112 also includes the data storage server controller 126 that can communicate with the data storage client controller 124 in the client device 102 to exchange data used identify and assign storage locations to data associated with a user and data associated with a communication session including a plurality of users. The data storage server controller 126 can also be coupled to the messaging server application 114 to establish an electronic group communication session (e.g., group chat, instant messaging) for the client devices in a communication session.

The application server 112 is communicatively coupled to a database server 118, which facilitates access to a database 120 in which is stored data associated with messages processed by the messaging server application 114.

Figure 2:
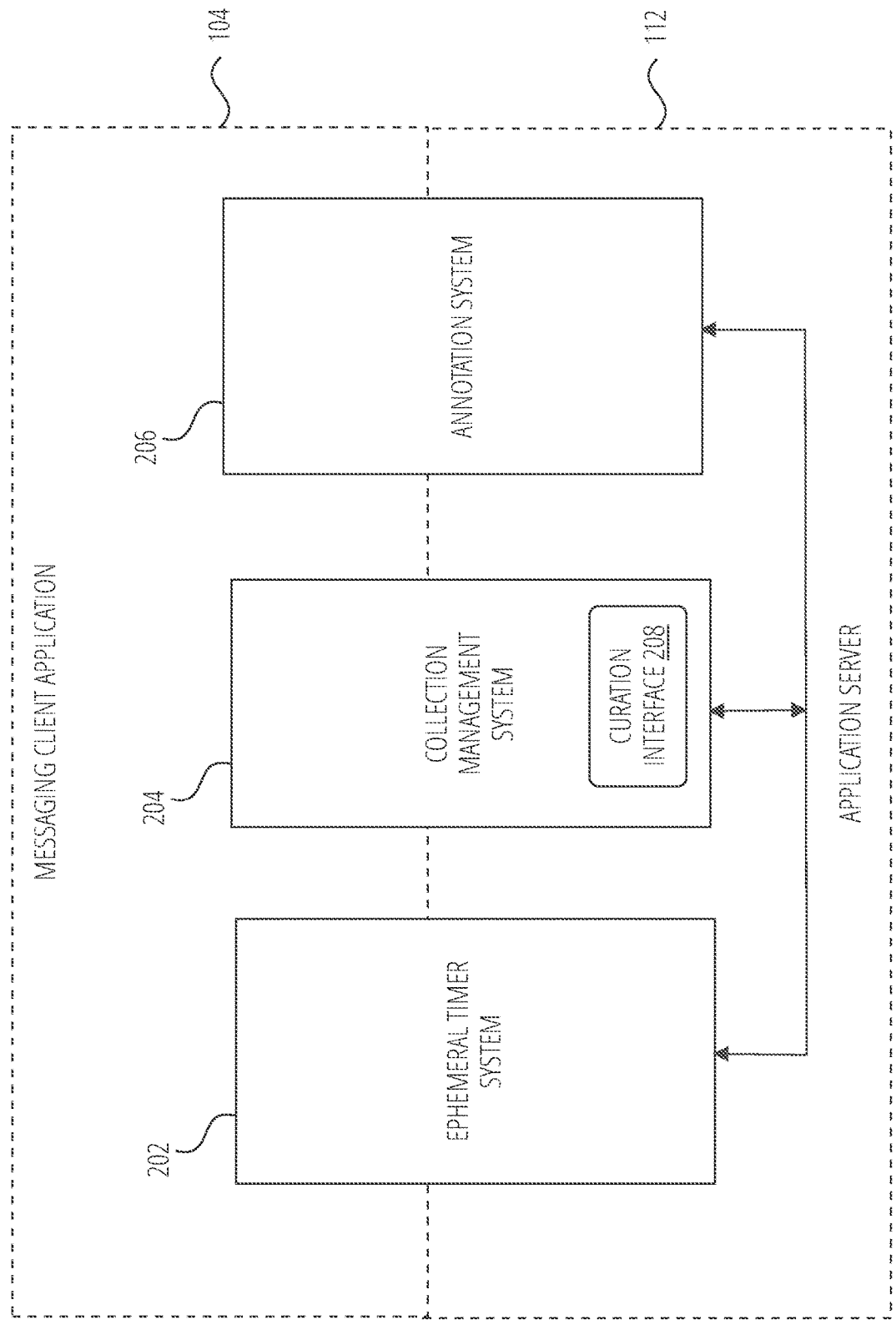
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 are augmented reality content items (e.g., corresponding to applying Lenses or augmented reality experiences). An augmented reality content item may be a real-time special effect and sound that may be added to an image or a video.

As described above, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured, and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

The database 120 can also store location information data pertaining to each of the users in the messaging system 100 as well as location information data pertaining to each communication session between multiple users in the messaging system 100 in the data location table 316. The data location table 316 can include a historical database for each of the users in the messaging system 100 to store the location information data pertaining to the users. For example, the historical database can include a history of the locations that are previously recorded in association with the users. For example, data associated with the users can comprise the home location data including a region location (e.g., New York or East Coast United States) and country location (e.g., United States). The location information data pertaining to each communication session can include the identification of the storage location selected to store the shared data associated with the communication session (e.g., communication session data). The identification of the storage location can include a name, an identification number, a network address, a region location, or a country location.

Figure 4:
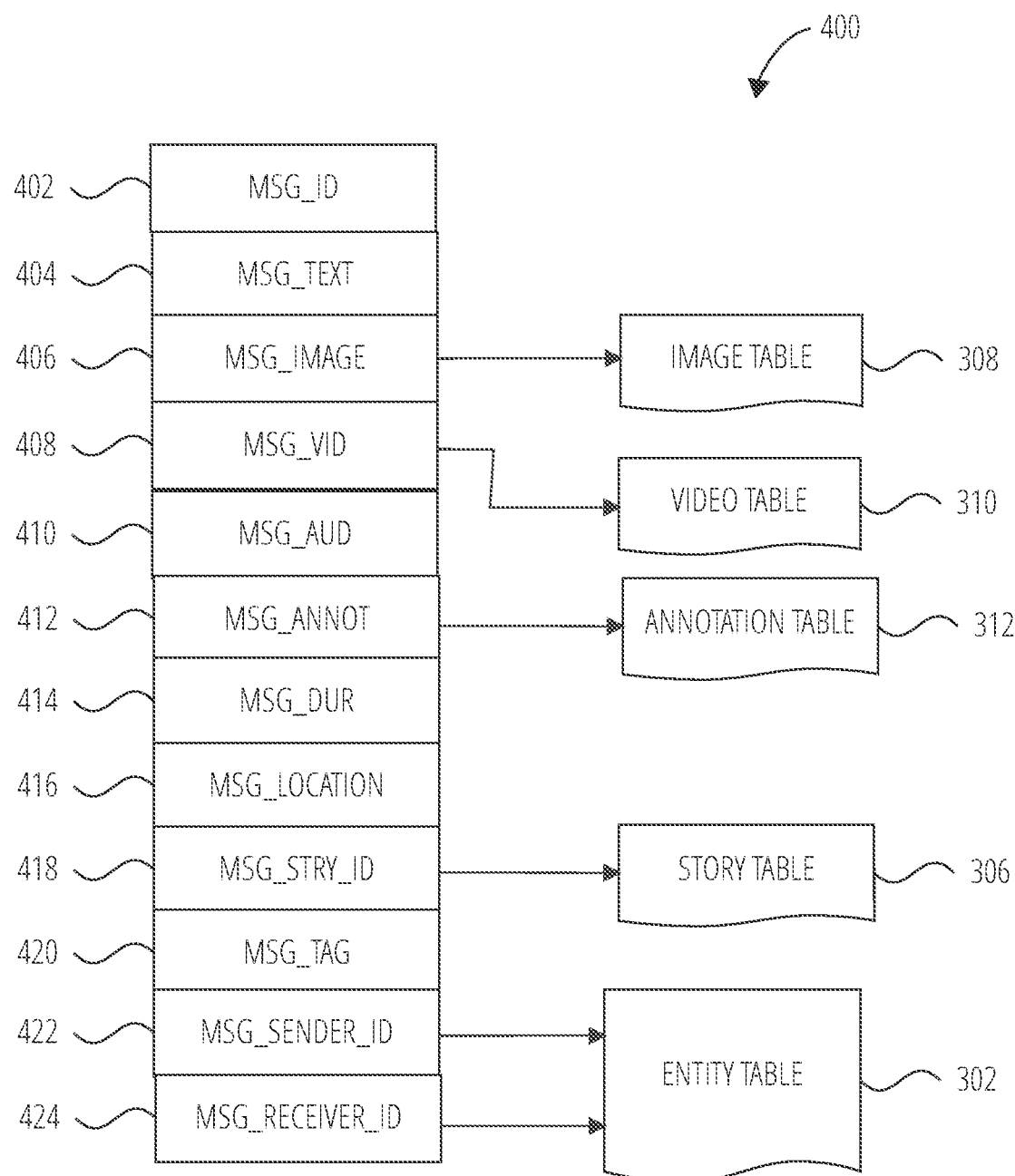
FIG. 4 is a diagrammatic representation of a message, in accordance with some example embodiments.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Although the following flowcharts can describe the operations as a sequential process, many of the operations can be performed in parallel or concurrently. In addition, the order of the operations may be re-arranged. A process is terminated when its operations are completed. A process may correspond to a method, a procedure, etc. The steps of methods may be performed in whole or in part, may be performed in conjunction with some or all of the steps in other methods, and may be performed by any number of different systems, such as the systems described in FIG. 1, and/or FIG. 8, or any portion thereof, such as a processor included in any of the systems.

Figure 5:
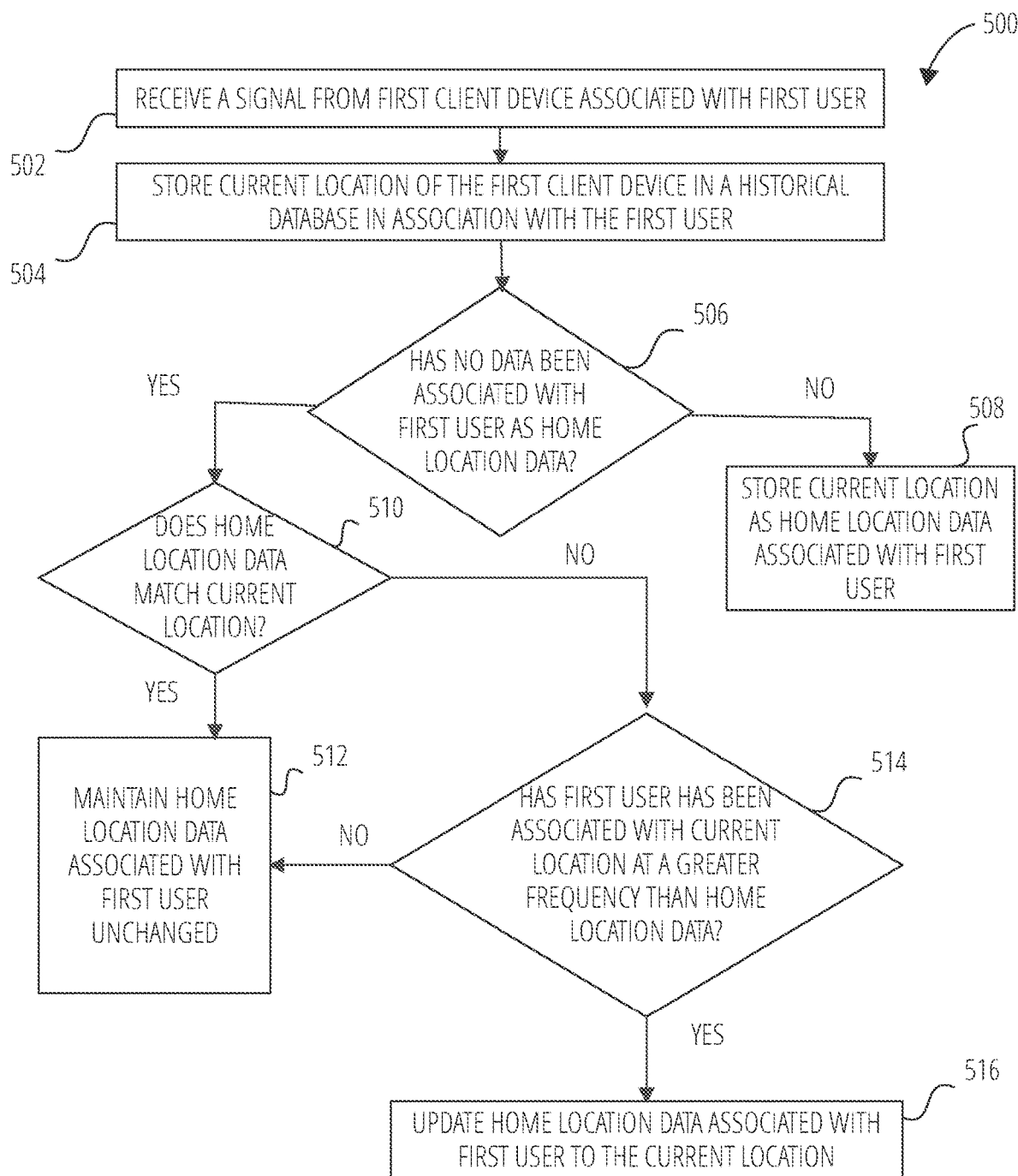
FIG. 5 illustrates a process 500 of dynamically assigning a storage location for a user data in accordance with one embodiment.

FIG. 5 illustrates a process 500 of dynamically assigning a storage location for a user data in accordance with one embodiment. The data associated with each of the users can include user data such as profile data, preferences, subscriptions, user connections on the messaging system, etc. In one embodiment, the process 500 can be performed by the data storage server controller 126 in the messaging server system 108.

In process 500, the data storage server controller 126 receives a signal from a first client device 102 that is associated with a first user, at operation 502. In one embodiment, the signal can be generated when the first user via the first client device 102 signs up for the messaging service maintained by the messaging server system 108. The signal can also be generated when the first user using the first client device 102 logs into the messaging server system 108. The signal can include the location information that is provided by the first user or by the first client device 102. For example, the first user can input his home location when signing up with the messaging server system 108. The location information can also be generated by a Global Positioning System (GPS) location service that has been enabled on the client device 102 such that the location information that is provided to the data storage server controller 126 is the client device 102's GPS recorded location. In another embodiment, using the signal from the first client device 102, the data storage server controller 126 can also perform Internet Protocol (IP) tracing to determine the location of the first client device 102. The signal can also be a network signal from which the data storage server controller 126 can determine the location of the first client device 102.

At operation 504, the data storage server controller 126 stores a current location of the first client device 102 in a historical database associated with the first user. The data storage server controller 126 determines the current location of the first client device 102 using the signal that is received. The historical database can be stored in the data location table 316. The historical database associated with the first user can include a history of the locations that are previously recorded in association with the first user. For example, the history of the locations can include a region location and a country location. In one embodiment, the historical database also stores the home location data associated with the first user. The home location data indicates the location the first user spends the majority of his time. The home location data, in one embodiment, is the location in the historical database that appears the most frequently in the historical database. The home location data can also include a region location (e.g., New York or East Coast United States) and country location (e.g., United States).

The home location data is used by data storage server controller 126 (and data storage client controller 124) to optimize the storage location of the user's data. To optimize access to the user's data, in one embodiment, the storage location (e.g., data centers) that is selected to store the user's data is proximate to the user's home location identified by the home location data.

At operation 506, the data storage server controller 126 determines whether no data has been associated with the first user as a home location data. For example, when the first user signs up for the messaging server system 108 for the first time, the messaging server system 108 does not have any previous signals from which it can interpret the location the first user spends the majority of his time. If no data has been associated with the first user as a home location data in operation 506, at operation 508, the data storage server controller 126 stores the current location as the home location data associated with the first user. In this example, when the first user signs up for the first time for the messaging server system 108, the data storage server controller 126 will establish that his current location is his home location for the purposes of setting up the home location data.

If data has been associated with the first user as a home location data in operation 506, at operation 510, the data storage server controller 126 determines whether the home location data matches the current location.

At operation 512, the data storage server controller 126 maintains the home location data associated with the first user unchanged when the data storage server controller 126 determines that the home location data matches the current location. For example, when current location of the first client device 102 (e.g., New York, USA) matches home location identified by the home location data (e.g., New York, USA), the data storage server controller 126 establishes that the home location that is set and stored in data location table 316 is still current and valid.

When the data storage server controller 126 determines that the home location data does not match the current location, at operation 514, the data storage server controller 126 determines whether the first user has been associated with the current location at a greater frequency than the home location data. For example, the first user can be on vacation in Rome, Italy such that the current location of the first client device 102 (e.g., Rome, Italy) does not match home location identified by the home location data (e.g., New York, USA). In this example, the data storage server controller 126 needs to determine whether Rome, Italy could be the actual home location or just a one-time or infrequently visited location for the first user. To make this determination, the data storage server controller 126 can assess the historical database associated with the first user in data location table 316 to determine the number of times Rome, Italy (e.g., current location) appears in the historical database compared to the number of times New York, USA (e.g., home location indicated in the home location data).

When data storage server controller 126 determines that the first user has been associated with the current location at a greater frequency than the home location data, the data storage server controller 126 updates the home location data associated with the first user to the current location at operation 516. For example, if Rome, Italy occurs more frequently than New York, USA, the data storage server controller 126 can determine that New York was the vacation location and Rome is the home location. The data storage server controller 126 can update the home location data associated with the first user to Rome, Italy and thereby, replacing New York, USA as the home location.

In one embodiment, when the home location data is updated to the current location, the data storage server controller 126 updates the user data storage location from a first storage location to a second storage location based on the updated home location data. The first and second storage location are data centers at different geographic locations. The first storage location can be located closer to the previous home location (e.g., New York) whereas the second storage location can be located closer to the updated home location (e.g., Rome, Italy).

The data storage server controller 126 can then determine whether to transfer the user data associated with the first user to the second location based on, for example, a size of the user data, a usage frequency associated with the first user, a latency cost associated with storing the user data associated with the first user in the first location and the second location, a financial cost of storing the user data associated with the first user in the first location and the second location, etc.

The data storage server controller 126 uses these factors to assess the ease and cost of the transfer. For example, if the first user's data is a small amount of data, the data storage server controller 126 can determine that the transfer would be simple such that it is worth performing the transfer. If the first user is a very frequent user of the messaging server system 108, the data storage server controller 126 can determine that it is worth transferring the user's data because the first user accesses the data frequently.

In another example, the data storage server controller 126 may determine that further assessments are needed before transferring data if the first user is a frequent user of the messaging system 100 because the size of the first user's data and the number of communication sessions that include this user is significant. The latency costs of the transfer (e.g., how intrusive it would be to the first user or other users) can thus also affect the data storage server controller 126's decision to transfer the first user's data. The data storage server controller 126 can also assess a financial cost (e.g., price of storage) of the first storage in comparison to the second storage. The data storage server controller 126 can also consider the performance capabilities of each of the storages in determining whether to transfer the user's data. The data storage server controller 126 can also use these factors to weigh the ease and cost of the transfer against the benefit to the first user (e.g., perceived latency decrease, performance increase, etc.).

In one embodiment, based on the determination that the transfer of the first user's data to the second location is desirable (or optimal), the data storage server controller 126 can then cause the user data associated with the first user to be transferred to the second location.

At operation 514, when the data storage server controller 126 determines that the first user has not been associated with the current location at a greater frequency than the home location data, the data storage server controller 126 maintains the home location data associated with the first user unchanged, at operation 512. In this example, the data storage server controller 126 determines that Rome, Italy does not occur more frequently than New York, USA, such that Rome was only a vacation location such that New York remains the home location.

Figure 6:
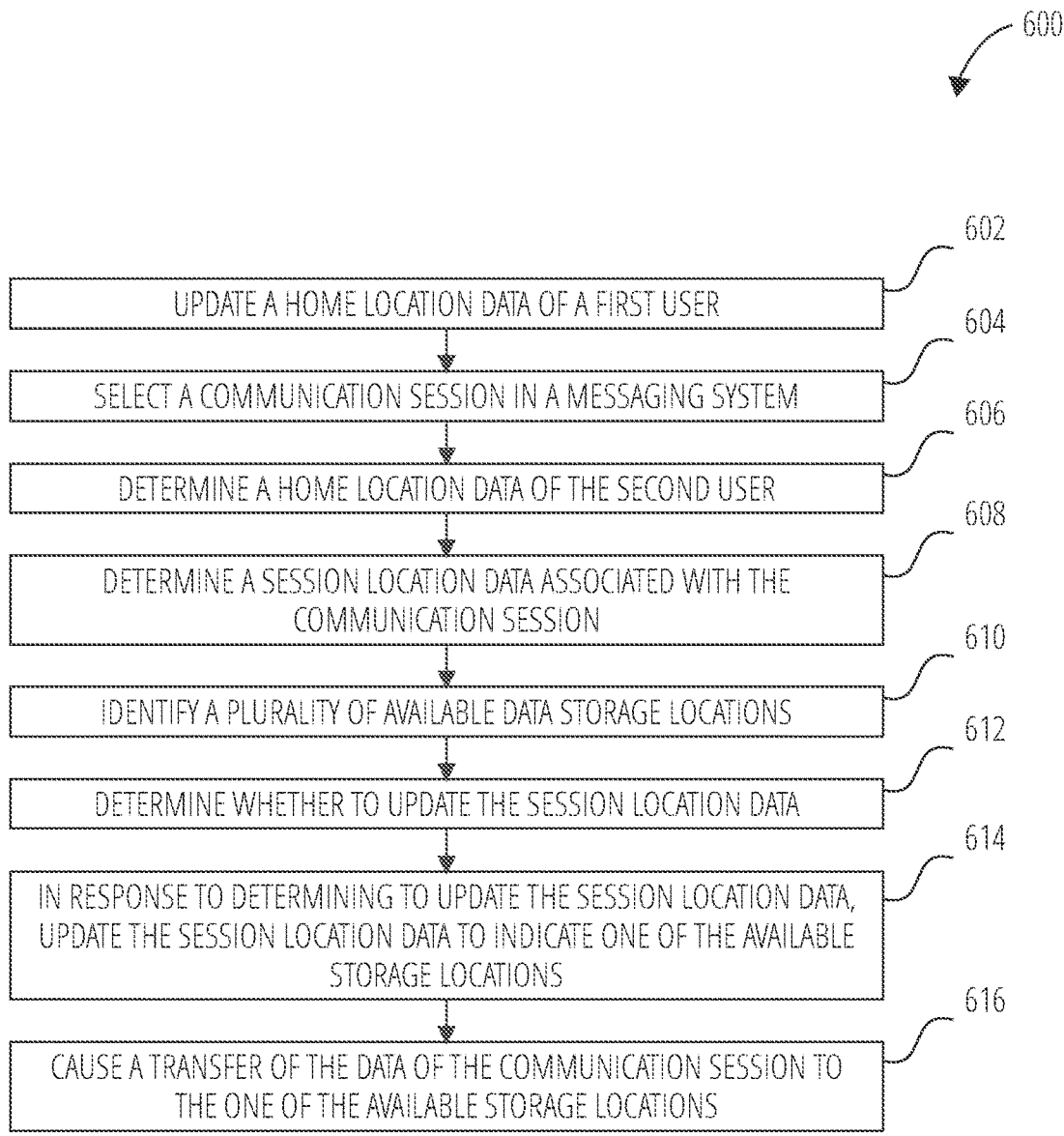
FIG. 6 illustrates a process 600 dynamically assigning a storage location for a communication session data in accordance with one embodiment.

FIG. 6 illustrates a process 600 dynamically assigning a storage location for a communication session data in accordance with one embodiment. The shared data between multiple users in a messaging conversation can media content items (e.g., text messages, images, videos, animations, webpage links, etc.) that were shared with each of the users in the messaging conversation via a messaging interface. In one embodiment, the process 600 can be performed by the data storage server controller 126 in the messaging server system 108.

In process 600, the data storage server controller 126 updates, at operation 602, a home location data of a first user. The first user is associated with a first client device 102 and the home location data indicates a home location associated with the first user. In one embodiment, the historical database in the data location table 316 stores the home location data associated with each of the users in the messaging server system 108 including the first user. The first user's home location data indicates the location the first user spends the majority of his time. The home location data, in one embodiment, is the location in the historical database that appears the most frequently in the historical database associated with the first user. The home location data can also include a region location (e.g., New York or East Coast United States) and country location (e.g., United States).

When a home location of a first user is updated, this update can signal to the data storage server controller 126 that a reevaluation of the decision to select a given storage location (e.g., data center) to store the communication session data between the first user and other users in the messaging system 100 may be needed.

At operation 604, the data storage server controller 126 selects a communication session in a messaging system 100. The communication session can be a messaging conversation or an electronic group communication session such as a group chat, group instant messaging between a plurality of users via client devices 102 (not shown). The communication session can comprise a plurality of users exchanging media content items. In one embodiment, the communication session comprises the first user and a second user associated with a second client device 102. In another embodiment, the communication session comprises the first user, the second user and a third user associated with a third client device 102.

At operation 606, the data storage server controller 126 determines a home location data of the second user. In one embodiment, the home location data of the second user is stored in the data location table 316 in a historical database associated with the second user. The home location data of the second user indicates the home location of the second user (e.g., Los Angeles, California, or USA).

At operation 608, the data storage server controller 126 determines a session location data associated with the communication session. The session location data indicates a current storage location (e.g., a data center) storing data of the communication session received from the client devices 102 of the users included in the communication session. For example, the communication session data can be the shared data received from the first client device 102, the second client device 102, the third client device 102 or any combination thereof. The communication session data can be media content items (e.g., text messages, images, videos, animations, webpage links, etc.) that are shared with each of the users in the messaging conversation via a messaging interface. The session location data can include the identification of the storage location selected to store the communication session data. The identification of the storage location can include a name, an identification number, a network address, a region location, or a country location.

At operation 610, the data storage server controller 126 identifies a plurality of available data storage locations based on the home location data of the first user and the home location data of the second user. The messaging server system 108 can have access to a number of data centers geographically located around the World to store communication session data. Among these data centers, the data storage server controller 126 can identify the data centers that are available and that would optimize the access to shared data between the users in a given communication session. For example, if the home location of the first user is in New York and the home location of the second user is in Los Angeles, data storage locations (e.g., data centers) located in the middle of the United States can be identified as available data storage locations that could be used.

At operation 612, the data storage server controller 126 determines whether to update the session location data. In one embodiment, the data storage server controller 126 determines whether to update the session location data is based on an average of a distance over network fiber using the home location of each of the users in the communication session (e.g., first user, second user, third user, etc.), the current storage location, and the available storage locations. Since network fiber is not laid uniformly across the globe, the distance over network fiber (e.g., distance travelled by the electrons of the shared data) between the home location of each of the users is considered to determine where the shared data should optimally be stored.

For example, if the first user's home location is updated from Rome to New York and the second user's home location is in Tokyo, the data storage server controller 126 can determine based on the average distance over network fiber using the home locations of the first and second user that the storage location for the communication session between the first and second user should be changed from the data center in Eastern Europe to a data center in Western United States.

In one embodiment, the data storage server controller 126 can also use an average of the latency in the communication session experienced by each of the users in the communication session to determine whether to update the session location data. In one example, if the home location of the first user is updated from London in New York and the home location of the two other users in the communication session are in Europe (e.g., Paris), the data storage server controller 126 may determine not to update the session location data which indicates a storage location in Europe, even though the first user's updated home location is in New York because the net benefit for the group of users in this communication session is greater if the storage location for the communication session data (as identified by the session location data) remains unchanged.

In another embodiment, the data storage server controller 126 determines whether a ratio of the average distance over network fiber and the average of the latency in the communication session is less than a predetermined threshold. Given that the distance over network fiber is associated with a given cost per distance, the data storage server controller 126 can establish a cost amount for improvement in perceived latency using this ratio. The predetermined threshold can be a cost per improvement in perceived latency (e.g., $ per millisecond of improvement).

The data storage server controller 126 can also assess the size of the data of the communication session, a cost or a performance of the current storage location and the plurality of available data storage locations, and the frequency of usage of the messaging system 100 by the users in the communication session, or any combination thereof to determine whether to update the session location data. For example, the data storage server controller 126 can determine that a smaller sized communication session data is easier and less costly to transfer such that the transfer is desirable.

The data storage server controller 126 can also assess a financial cost (e.g., price of storage) of the transfer from a first storage (e.g., current storage location) to a second storage (e.g., one of the available storage locations). The data storage server controller 126 can also consider the performance capabilities of each of the storages in determining whether to transfer the communication session data. The data storage server controller 126 can also use these factors to weigh the ease and cost of the transfer against the benefit to the users in the communication session (e.g., perceived latency decrease, performance increase, etc.).

The cost or the performance of storage locations can also be considered when selecting the single storage location. The selection of the single storage location can also be reevaluated periodically or upon detection of changes including, for example, a change in the home location of any of the users, a change in the number of available storage locations, a change in the cost or performance of the available storage locations, etc.

At operation 614, in response to determining to update the session location data, the data storage server controller 126 updates the session location data to indicate one of the available storage locations. In one embodiment, the one of the available storage location is selected based on the location, cost, performance, etc. At operation 616, the data storage server controller 126 causes a transfer of the data of the communication session to the available storage location indicated in the session location data.

In one embodiment, a reevaluation of the decision to select a given storage location (e.g., data center) to store the communication session data between the first user and other users in the messaging system 100 may also be triggered when the data storage server controller 126 detects a change in the plurality of available data storage locations. For example, the change can include an addition of an available storage location or a closing of a storage location, or a change in the cost or performance of the available data storage locations. In this embodiment, the data storage server controller 126 can determine whether to update the session location data based on the change in the plurality of available storage locations.

The data storage server controller 126 can also reevaluate the decision to select a given storage location when the data storage server controller 126 detects a change in the current storage location. The change can be that the current storage location is closing, or that the cost or performance of the current storage location is changing. In this embodiment, the data storage server controller 126 determines whether to update the session location data based on the change in the current storage location.

Figure 7:
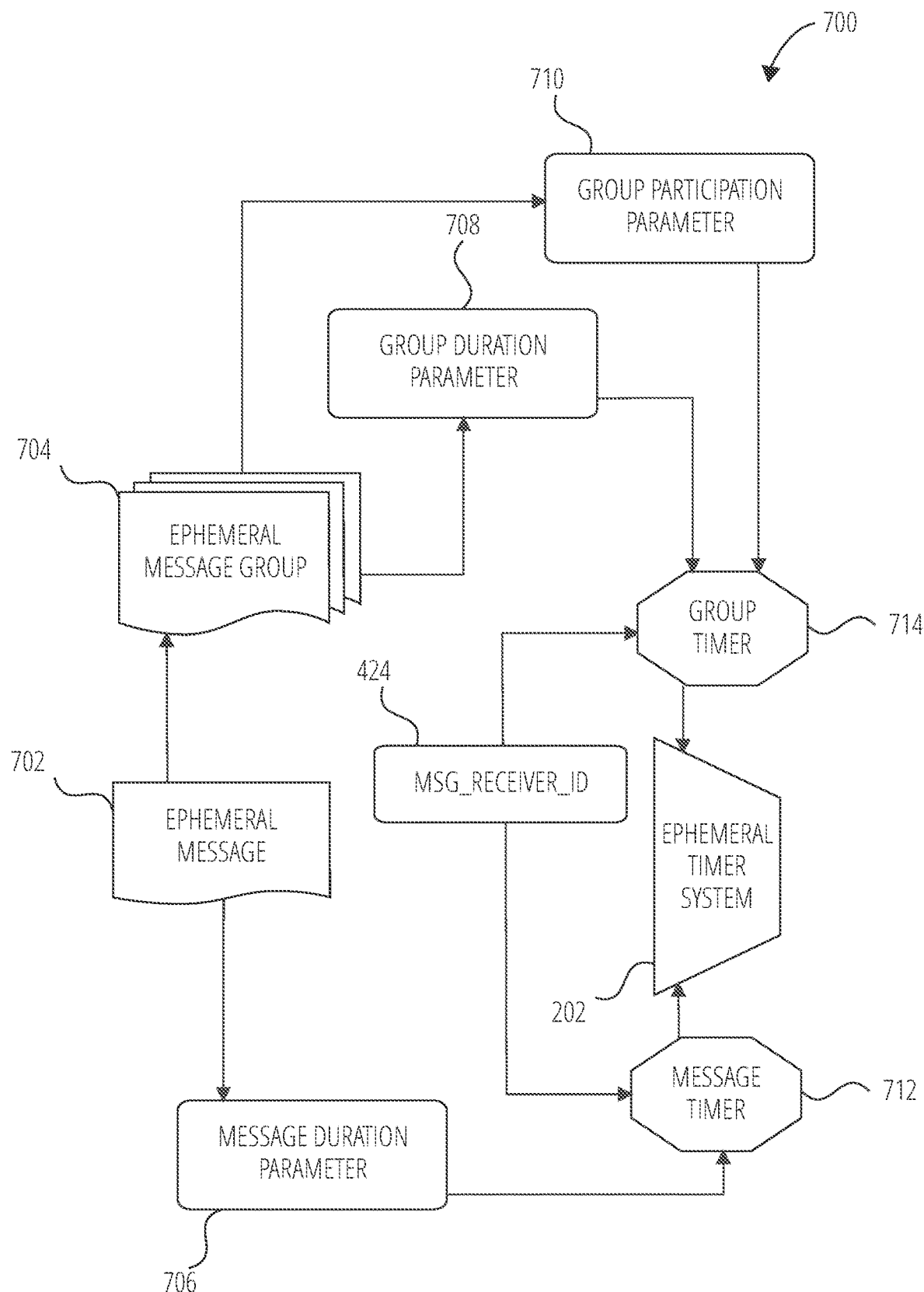
FIG. 7 is a flowchart for an access-limiting process, in accordance with some example embodiments.

FIG. 7 is a schematic diagram illustrating an access-limiting process 700, in terms of which access to content (e.g., an ephemeral message 702, and associated multimedia payload of data) or a content collection (e.g., an ephemeral message group 704) may be time-limited (e.g., made ephemeral).

An ephemeral message 702 is shown to be associated with a message duration parameter 706, the value of which determines an amount of time that the ephemeral message 702 will be displayed to a receiving user of the ephemeral message 702 by the messaging client application 104. In one embodiment, an ephemeral message 702 is viewable by a receiving user for up to a maximum of 10 seconds, depending on the amount of time that the sending user specifies using the message duration parameter 706.

The message duration parameter 706 and the message receiver identifier 424 are shown to be inputs to a message timer 712, which is responsible for determining the amount of time that the Ephemeral message 702 is shown to a particular receiving user identified by the message receiver identifier 424. In particular, the ephemeral message 702 will only be shown to the relevant receiving user for a time period determined by the value of the message duration parameter 706. The message timer 712 is shown to provide output to a more generalized ephemeral timer system 202, which is responsible for the overall timing of display of content (e.g., an ephemeral message 702) to a receiving user.

The ephemeral message 7022 is shown in FIG. 7 to be included within an ephemeral message group 704 (e.g., a collection of messages in a personal story, or an event story). The ephemeral message group 704 has an associated group duration parameter 708, a value of which determines a time-duration for which the ephemeral message group 704 is presented and accessible to users of the messaging system 100. The group duration parameter 708, for example, may be the duration of a music concert, where the ephemeral message group 704 is a collection of content pertaining to that concert. Alternatively, a user (either the owning user or a curator user) may specify the value for the group duration parameter 708 when performing the setup and creation of the ephemeral message group 704.

Additionally, each ephemeral message 702 within the ephemeral message group 704 has an associated group participation parameter 710, a value of which determines the duration of time for which the ephemeral message 702 will be accessible within the context of the ephemeral message group 704. Accordingly, a particular ephemeral message group 704 may "expire" and become inaccessible within the context of the ephemeral message group 704, prior to the ephemeral message group 704 itself expiring in terms of the group duration parameter 708. The group duration parameter 708, group participation parameter 710, and message receiver identifier 424 each provide input to a group timer 714, which operationally determines, firstly, whether a particular ephemeral message 702 of the ephemeral message group 704 will be displayed to a particular receiving user and, if so, for how long. Note that the ephemeral message group 704 is also aware of the identity of the particular receiving user as a result of the message receiver identifier 424.

Accordingly, the group timer 714 operationally controls the overall lifespan of an associated ephemeral message group 704, as well as an individual ephemeral message 702 included in the ephemeral message group 704. In one embodiment, each and every ephemeral message 702 within the ephemeral message group 704 remains viewable and accessible for a time-period specified by the group duration parameter 708. In a further embodiment, a certain ephemeral message 702 may expire, within the context of ephemeral message group 704, based on a group participation parameter 710. Note that a message duration parameter 706 may still determine the duration of time for which a particular ephemeral message 702 is displayed to a receiving user, even within the context of the ephemeral message group 704. Accordingly, the message duration parameter 706 determines the duration of time that a particular ephemeral message 702 is displayed to a receiving user, regardless of whether the receiving user is viewing that ephemeral message 702 inside or outside the context of an ephemeral message group 704.

The ephemeral timer system 202 may furthermore operationally remove a particular ephemeral message 702 from the ephemeral message group 704 based on a determination that it has exceeded an associated group participation parameter 710. For example, when a sending user has established a group participation parameter 710 of 24 hours from posting, the ephemeral timer system 202 will remove the relevant ephemeral message 702 from the ephemeral message group 704 after the specified 24 hours. The ephemeral timer system 202 also operates to remove an ephemeral message group 704 either when the group participation parameter 710 for each and every ephemeral message 702 within the ephemeral message group 704 has expired, or when the ephemeral message group 704 itself has expired in terms of the group duration parameter 708.

In certain use cases, a creator of a particular ephemeral message group 704 may specify an indefinite group duration parameter 708. In this case, the expiration of the group participation parameter 710 for the last remaining ephemeral message 702 within the ephemeral message group 704 will determine when the ephemeral message group 704 itself expires. In this case, a new ephemeral message 702, added to the ephemeral message group 704, with a new group participation parameter 710, effectively extends the life of an ephemeral message group 704 to equal the value of the group participation parameter 710.

Responsive to the ephemeral timer system 202 determining that an ephemeral message group 704 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 704 to no longer be displayed within a user interface of the messaging client application 104. Similarly, when the ephemeral timer system 202 determines that the message duration parameter 706 for a particular ephemeral message 702 has expired, the ephemeral timer system 202 causes the messaging client application 104 to no longer display an indicium (e.g., an icon or textual identification) associated with the ephemeral message 702.

Figure 8:
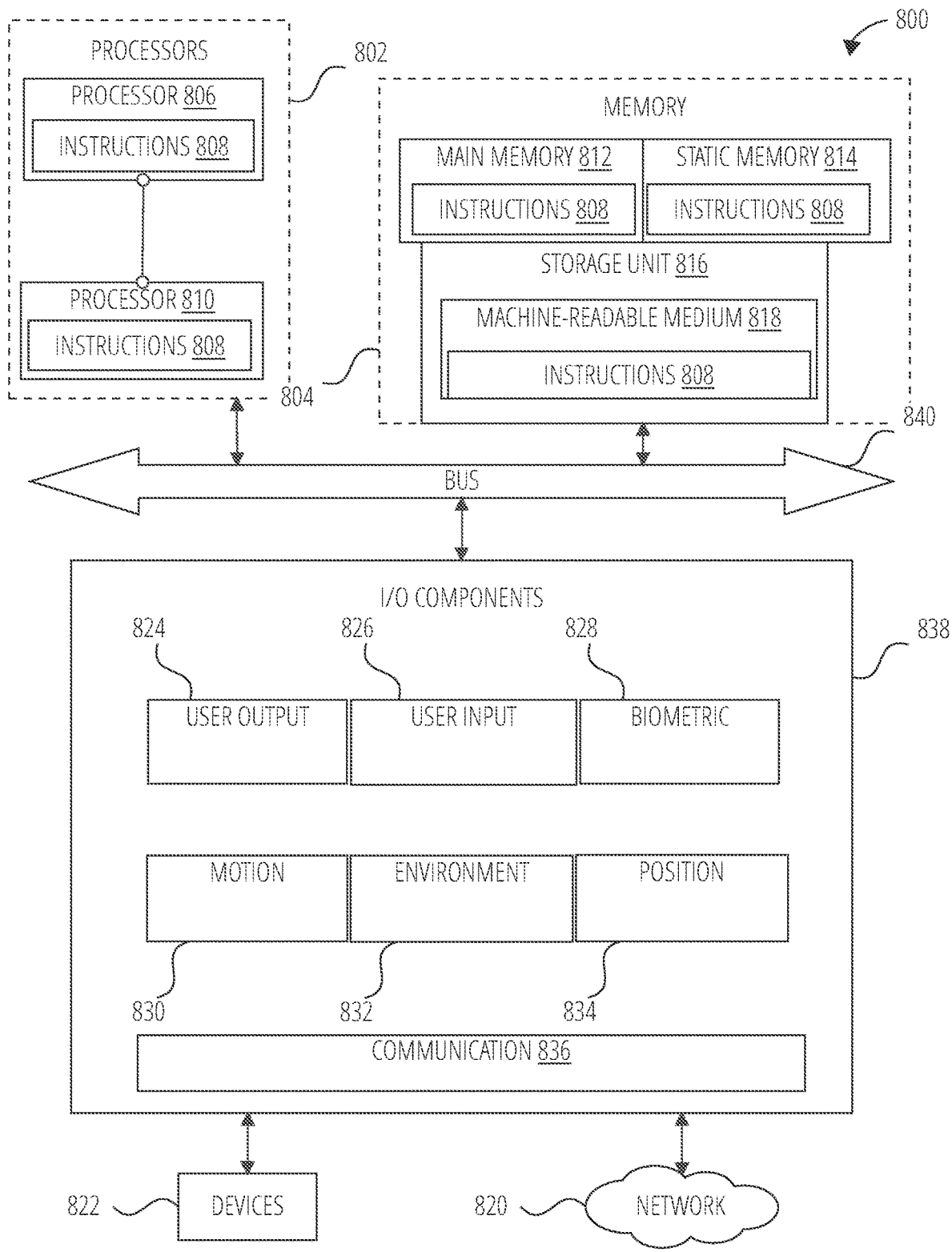
FIG. 8 is a diagrammatic representation of a machine in the form of a computer system within which a set of instructions may be executed for causing the machine to perform any one or more of the methodologies discussed herein, in accordance with some example embodiments.

FIG. 8 is a diagrammatic representation of the machine 800 within which instructions 808 (e.g., software, a program, an application, an applet, an app, or other executable code) for causing the machine 800 to perform any one or more of the methodologies discussed herein may be executed. For example, the instructions 808 may cause the machine 800 to execute any one or more of the methods described herein. The instructions 808 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 808, sequentially or otherwise, that specify actions to be taken by the machine 800. Further, while only a single machine 800 is illustrated, the term "machine" shall also be taken to include a collection of machines that individually or jointly execute the instructions 808 to perform any one or more of the methodologies discussed herein.

The machine 800 may include processors 802, memory 804, and I/O components 838, which may be configured to communicate with each other via a bus 840. In an example embodiment, the processors 802 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 806 and a Processor 810 that execute the instructions 808. The term "Processor" is intended to include multi-core processors that may comprise two or more independent processors (sometimes referred to as "cores") that may execute instructions contemporaneously. Although FIG. 8 shows multiple processors 802, the machine 800 may include a single Processor with a single core, a single Processor with multiple cores (e.g., a multi-core Processor), multiple processors with a single core, multiple processors with multiples cores, or any combination thereof.

The memory 804 includes a main memory 812, a static memory 814, and a storage unit 816, both accessible to the processors 802 via the bus 840. The main memory 804, the static memory 814, and storage unit 816 store the instructions 808 embodying any one or more of the methodologies or functions described herein. The instructions 808 may also reside, completely or partially, within the main memory 812, within the static memory 814, within machine-readable medium 818 within the storage unit 816, within at least one of the processors 802 (e.g., within the Processor's cache memory), or any suitable combination thereof, during execution thereof by the machine 800.

The I/O components 838 may include a wide variety of components to receive input, provide output, produce output, transmit information, exchange information, capture measurements, and so on. The specific I/O components 838 that are included in a particular machine will depend on the type of machine. For example, portable machines such as mobile phones may include a touch input device or other such input mechanisms, while a headless server machine will likely not include such a touch input device. It will be appreciated that the I/O components 838 may include many other components that are not shown in FIG. 8. In various example embodiments, the I/O components 838 may include user output components 824 and user input components 826. The user output components 824 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 838 may include biometric components 828, motion components 830, environmental components 832, or position components 834, among a wide array of other components. For example, the biometric components 828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 830 include acceleration sensor components (e.g., accelerometer), gravitation sensor components, rotation sensor components (e.g., gyroscope). The environmental components 832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 834 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 838 further include communication components 836 operable to couple the machine 800 to a network 820 or devices 822 via respective coupling or connections. For example, the communication components 836 may include a network interface Component or another suitable device to interface with the network 820. In further examples, the communication components 836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 822 may be another machine or any of a wide variety of peripheral devices (e.g., a peripheral device coupled via a USB).

Moreover, the communication components 836 may detect identifiers or include components operable to detect identifiers. For example, the communication components 836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 836, such as location via Internet Protocol (IP) geolocation, location via Wi-Fi® signal triangulation, location via detecting an NFC beacon signal that may indicate a particular location, and so forth.

The various memories (e.g., main memory 812, static memory 814, and/or memory of the processors 802) and/or storage unit 816 may store one or more sets of instructions and data structures (e.g., software) embodying or used by any one or more of the methodologies or functions described herein. These instructions (e.g., the instructions 808), when executed by processors 802, cause various operations to implement the disclosed embodiments.

The instructions 808 may be transmitted or received over the network 820, using a transmission medium, via a network interface device (e.g., a network interface Component included in the communication components 836) and using any one of several well-known transfer protocols (e.g., hypertext transfer protocol (HTTP)). Similarly, the instructions 808 may be transmitted or received using a transmission medium via a coupling (e.g., a peer-to-peer coupling) to the devices 822.

Figure 9:
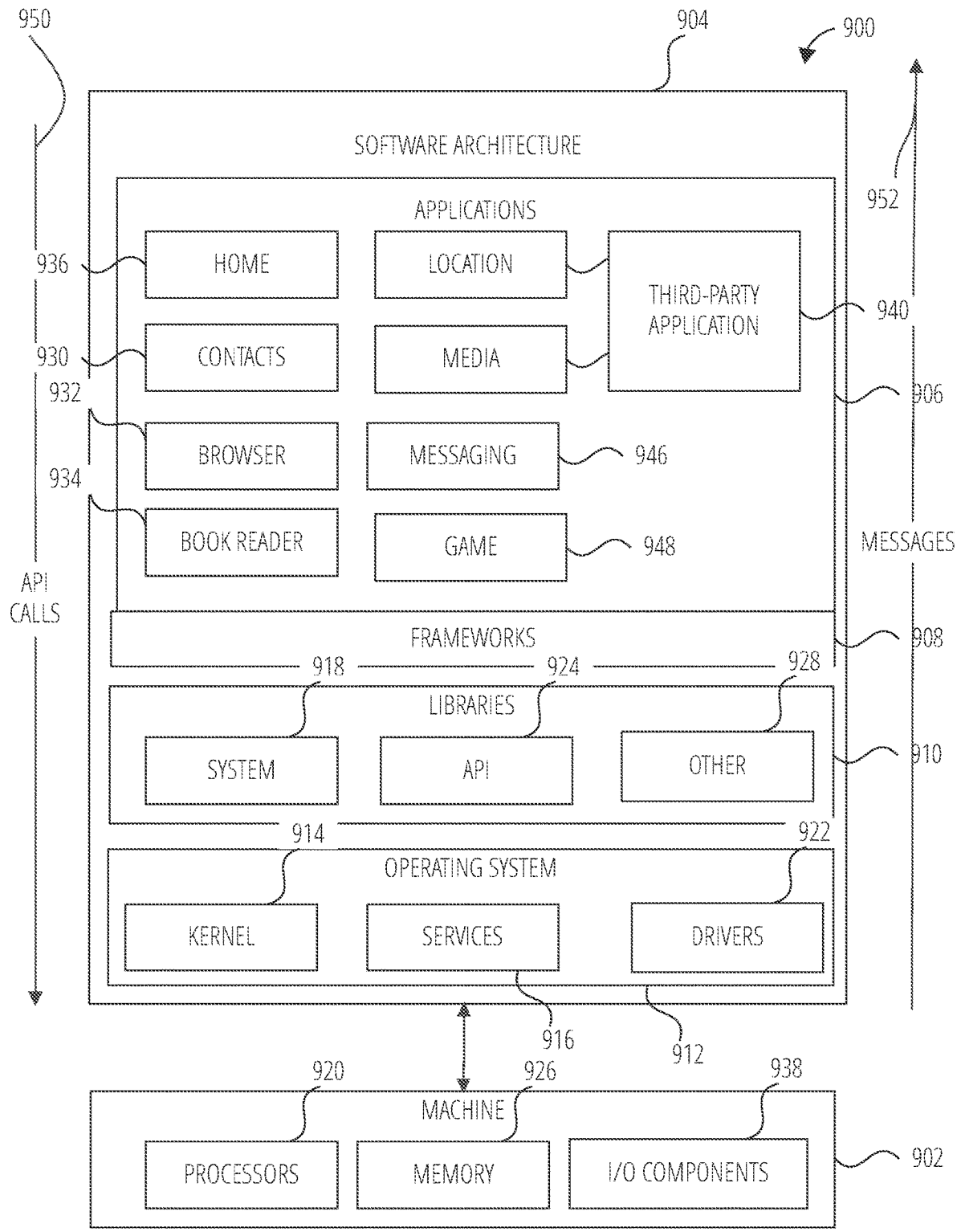
FIG. 9 is block diagram showing a software architecture within which the present disclosure may be implemented, according to an example embodiment.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, Processor management (e.g., scheduling), Component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLU- ETOOTH® Low Energy drivers, flash memory drivers, serial communication drivers (e.g., Universal Serial Bus (USB) drivers), WI-FI® drivers, audio drivers, power management drivers, and so forth.

The libraries 910 provide a low-level common infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a high-level common infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example embodiment, the applications 906 may include a home application 936, a contacts application 930, a browser application 932, a book reader application 934, a location application 942, a media application 944, a messaging application 946, a game application 948, and a broad assortment of other applications such as a third-party application 940. The e applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

What is claimed is:

1. A system comprising:
a processor; and
a memory having instructions stored thereon, when executed by the processor, causes the system to perform operations comprising:
determining a session location data associated with a communication session in a messaging system comprising a first user associated with a first client device and a second user associated with a second client device, the session location data indicating a current storage location storing data of the communication session received from the first client device and the second client device;
identifying a plurality of available storage locations based on a home location data of the first user and a home location data of the second user;
determining whether to update the session location data based on the home location data of the first user, the home location data of the second user, the current storage location, the available storage locations, and a size of the data of the communication session received from the first user and the second user;
in response to determining to update the session location data,
updating the session location data to indicate one of the available storage locations, and
causing a transfer of the data of the communication session to the one of the available storage locations.

2. The system of claim 1, wherein determining whether to update the session location data is further based on an average of a latency in the communication session experienced by the first user and by the second user.

3. The system of claim 1, wherein determining whether to update the session location data further comprises determining whether a ratio of an average distance over network fiber and an average of a latency in the communication session is less than a predetermined threshold.

4. The system of claim 1,
wherein the session location data further stores data of the communication session received from a third client device, wherein the communication session further comprises a third user associated with the third client device,
wherein the plurality of available storage locations is further based on a home location data of the third user, and
wherein determining whether to update the session location data is further based on an average of a distance over network fiber using the home location data of the third user.

5. The system of claim 4, wherein determining whether to update the session location data is further based on an average of a latency in the communication session experienced by the first user, by the second user, and by the third user.

6. The system of claim 4, wherein determining whether to update the session location data is further based on a usage frequency of the messaging system associated with the first user and the second user.

7. The system of claim 4, wherein determining whether to update the session location data is further based on a cost or a performance of the current storage location and the plurality of available storage locations.

8. The system of claim 4, wherein determining whether to update the session location data is further based on a usage frequency of the messaging system associated with the third user.

9. The system of claim 4, further comprising:
detecting a change in the plurality of available storage locations, wherein the change is an addition of an available storage location or a closing of a storage location, or a change in a cost or performance of the available storage locations; and
determining whether to update the session location data based on the change in the plurality of available storage locations.

10. The system of claim 4, further comprising:
  detecting a change in the current storage location, wherein the change is the current storage location is a closing of the current storage location, or a change in a cost or performance of the current storage location; and
  determining whether to update the session location data based on the change in the current storage location.

11. A method comprising:
  determining a session location data associated with a communication session in a messaging system comprising a first user associated with a first client device and a second user associated with a second client device, the session location data indicating a current storage location storing data of the communication session received from the first client device and the second client device;
  identifying a plurality of available storage locations based on the home location data of the first user and the home location data of the second user;
  determining whether to update the session location data based on the home location data of the first user, the home location data of the second user, the current storage location, the available storage locations, and a size of the data of the communication session received from the first user and the second user;
  in response to determining to update the session location data,
  updating the session location data to indicate one of the available storage locations, and
  causing a transfer of the data of the communication session to the one of the available storage locations.

12. The method of claim 11, wherein determining whether to update the session location data is further based on an average of a latency in the communication session experienced by the first user and by the second user.

13. The method of claim 11, wherein determining whether to update the session location data further comprises determining whether a ratio of an average distance over network fiber and an average of a latency in the communication session is less than a predetermined threshold.

14. The method of claim 11,
  wherein the session location data further stores data of the communication session received from a third client device, wherein the communication session further comprises a third user associated with the third client device,
  wherein the plurality of available storage locations is further based on a home location data of the third user, and
  wherein determining whether to update the session location data is further based on an average of a distance over network fiber using the home location data of the third user.

15. The method of claim 14, wherein determining whether to update the session location data is further based on an average of a latency in the communication session experienced by the first user, by the second user, and by the third user.

16. The method of claim 14, wherein determining whether to update the session location data is further based on a usage frequency of the messaging system associated with the first user and the second user.

17. The method of claim 14, wherein determining whether to update the session location data is further based on a cost or a performance of the current storage location and the plurality of available storage locations.

18. The method of claim 14, wherein determining whether to update the session location data is further based on a usage frequency of the messaging system associated with the third user.

19. The method of claim 14, further comprising:
  detecting a change in the plurality of available storage locations,
  wherein the change is an addition of an available storage location or a closing of a storage location, or a change in a cost or performance of the available storage locations; and
  determining whether to update the session location data based on the change in the plurality of available storage locations.

20. The method of claim 14, further comprising:
  detecting a change in the current storage location, wherein the change is the current storage location is a closing of the current storage location, or a change in a cost or performance of the current storage location; and
  determining whether to update the session location data based on the change in the current storage location.

21. A non-transitory computer-readable storage medium having stored thereon instructions, when executed by a processor, causes the processor to perform operations comprising:
  determining a session location data associated with a communication session in a messaging system comprising a first user associated with a first client device and a second user associated with a second client device, the session location data indicating a current storage location storing data of the communication session received from the first client device and the second client device;
  identifying a plurality of available storage locations based on a home location data of the first user and a home location data of the second user;
  determining whether to update the session location data based on an average of a distance over network fiber using the home location data of the first user, the home location data of the second user, the current storage location, the available storage locations, and a size of the data of the communication session received from the first user and the second user;
  in response to determining to update the session location data,
  updating the session location data to indicate one of the available storage locations, and
  causing a transfer of the data of the communication session to the one of the available storage locations.

* * * * *